United States Patent
San Martin et al.

(10) Patent No.: US 10,359,539 B2
(45) Date of Patent: Jul. 23, 2019

(54) CALIBRATION METHOD FOR MULTI-COMPONENT INDUCTION TOOLS

(71) Applicant: Halliburton Energy Services, Inc., Houston, TX (US)

(72) Inventors: Luis E. San Martin, Houston, TX (US); Dagang Wu, Katy, TX (US); Baris Guner, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1095 days.

(21) Appl. No.: 14/415,675

(22) PCT Filed: Mar. 25, 2014

(86) PCT No.: PCT/US2014/031755
§ 371 (c)(1),
(2) Date: Jan. 19, 2015

(87) PCT Pub. No.: WO2014/160724
PCT Pub. Date: Oct. 2, 2014

(65) Prior Publication Data
US 2015/0177412 A1 Jun. 25, 2015

Related U.S. Application Data

(60) Provisional application No. 61/806,226, filed on Mar. 28, 2013.

(51) Int. Cl.
*G01V 13/00* (2006.01)
*G01V 3/10* (2006.01)
*G01V 3/28* (2006.01)
*G01V 3/38* (2006.01)

(52) U.S. Cl.
CPC .............. *G01V 13/00* (2013.01); *G01V 3/104* (2013.01); *G01V 3/28* (2013.01); *G01V 3/38* (2013.01)

(58) Field of Classification Search
CPC ............... G01V 3/28; G01V 3/38; G01V 3/10
See application file for complete search history.

(56) References Cited

U.S. PATENT DOCUMENTS

| | | |
|---|---|---|
| 7,236,886 B2 | 6/2007 | Frenkel et al. |
| 7,414,391 B2 | 8/2008 | Homan et al. |
| 2003/0004646 A1 | 1/2003 | Haugland |

(Continued)

FOREIGN PATENT DOCUMENTS

| | | |
|---|---|---|
| WO | WO-2013036509 A1 | 3/2013 |
| WO | WO-2013036896 A1 | 3/2013 |
| WO | WO-2014160724 A1 | 10/2014 |

OTHER PUBLICATIONS

"International Application Serial No. PCT/US2014/031755, International Search Report dated Sep. 1, 2014", 5 pgs.

(Continued)

*Primary Examiner* — Mischita L Henson
(74) *Attorney, Agent, or Firm* — Gilliam IP PLLC (57) ABSTRACT

Calibration tools and procedures that provide one or more calibration methods for multi-component induction tools can include use of a tilted elliptical loop and a circular loop. Measurement signals may be used for analytic calibration of a multicomponent induction tool. Additional apparatus, systems, and methods are disclosed.

28 Claims, 7 Drawing Sheets

(56) References Cited

U.S. PATENT DOCUMENTS

| | | | |
|---|---|---|---|
| 2003/0229450 A1* | 12/2003 | Strickland | G01V 3/28 |
| | | | 702/10 |
| 2004/0113609 A1 | 6/2004 | Homan et al. | |
| 2007/0083330 A1 | 4/2007 | Frenkel | |
| 2007/0103160 A1 | 5/2007 | Pelegri | |
| 2007/0115000 A1 | 5/2007 | Merchant et al. | |
| 2008/0074115 A1 | 3/2008 | Pelegri et al. | |
| 2008/0121430 A1 | 5/2008 | Cole et al. | |
| 2012/0078558 A1 | 3/2012 | Pelegri et al. | |
| 2013/0080058 A1 | 3/2013 | Wu et al. | |

OTHER PUBLICATIONS

"International Application Serial No. PCT/US2014/031755, Written Opinion dated Sep. 1, 2014", 6 pgs.

Xiao, J., et al., "A new asymmetrical array induction logging tool", SPE 101930, SPE Annual Technical Conference and Exhibition, Sep. 24-27, San Antonio, Texas, USA, (2006), 1-15.

"Australian Application Serial No. 2014241523, First Examiner Report dated Mar. 21, 2016", 2 pgs.

"Australian Application Serial No. 2014241523, Response filed Jun. 14, 2016 to First Examiner Report dated Mar. 21, 2016", 19 pgs.

"European Application Serial No. 14775927.8, Office Action dated Nov. 4, 2015", 2 pgs.

"European Application Serial No. 14775927.8, Response filed May 3, 2016 to Office Action dated Nov. 4, 2015", 11 pgs.

"Australian Application Serial No. 2014241523, Subsequent Examiners Report dated Jul. 6, 2016", 10 pgs.

"European Application Serial No. 14775927.8, Extended European Search Report dated Sep. 29, 2016", 3 pgs.

"Canadian Application Serial No. 2,901,639, Office Action dated Sep. 23, 2016", 3 pgs.

"Gulf Cooperation Council Application Serial No. 2014-26918, First Examiner Report dated Mar. 29, 2017", 4 pages.

"Mexican Patent Application No. MX/a/2015/008550; Office Action dated Mar. 16, 2017.", 2 pages.

GCC Application Serial No. 2014-26918; Examination report; dated Jun. 6, 2018, 3 pages.

\* cited by examiner

CALIBRATION METHOD FOR MULTI-COMPONENT INDUCTION TOOLS

CLAIM OF PRIORITY

This application is a U.S. National Stage Filing under 35 U.S.C. 371 from International Application No. PCT/US2014/031755, filed on 25 Mar. 2014, and published as WO 2014/160724 A1 on 2 Oct. 2014, which application claims the benefit of U.S. Provisional Application Ser. No. 61/806,226, filed on Mar. 28, 2013; which application and publication are incorporated by reference herein in their entirety.

TECHNICAL FIELD

The present invention relates generally to apparatus and methods related to measurements and measurement tools.

BACKGROUND

In drilling wells for oil and gas exploration, understanding the structure and properties of the associated geological formation provides information to aid such exploration. Measurements in a wellbore, also referred to as a borehole, are typically performed to attain this understanding. The usefulness of such measurements may be related to the precision or quality of the information derived from such measurements. Such precision or quality may depend on calibration of the measurement tools, such as multi-component induction tools. Although calibration of traditional induction tools is well known, calibration for multi-component induction tools is limited.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, calibration techniques can include the use of a tilted calibrator. The tilted calibrator can be rotated or the tool being calibrated can be rotated to enable calibration. A tilted loop can be used to achieve calibration. The calibration may rotate the tool being calibrated. The tilted loop used in the calibration can be an elliptical tilted loop to enable more accurate modeling solution of non-traditional components, where the non-traditional components include cross components.

In various embodiments, one or more calibration techniques as taught herein can provide an accurate calibration method for the calibration of multi-component induction (MCI) tools. MCI tools can measure transverse coupling components in addition to the longitudinal coupling component measured by the traditional induction tools. Such calibration techniques can be denoted herein as a MCI calibration method. As in the calibrations of traditional induction tools, the MCI calibration method employs a calibration loop with a known resistance value that is chosen to produce a suitable signal level at a receiver antenna. Since the MCI tool measures all nine coupling components, the traditional calibration routine must be modified to allow the calibrations of these additional components. Calibration device or calibration loop herein refers to the device used in the calibration experiment.

In various embodiments, a calibration technique can be structured to achieve a good signal to noise ratio. Normally, the maximum signal values produced by the calibration device are recorded and used in the calibration process that is performed to calibrate the tool.

The presence of the transversal components X and Y, at ninety degrees from each other and perpendicular to the Z axis that coincides with the axis of the tool, makes the MCI tool sensitive to the azimuth angle. As a result of this component arrangement, a calibration experiment can include two longitudinal sweeps at ninety degrees from each other or, alternatively, sweeps along an azimuth angle at the axial position of the maximums of the transversal components. Both of these optional approaches can capture the maximum signals generated by the calibration device.

The accurate evaluation of the calibration experiment uses ideally an experiment that can be modeled accurately by an analytic solution. The task is complicated by the fact that induction tools normally have a metal cylinder concentric with the axis of the tool, inside of which, wires that connect to transmitters and receivers are shielded. The arrangement with the tilted transmitters and tilted receivers with a metallic cylinder at the center can be solved analytically in certain cases, and the solution can be implemented numerically to derive the values that the tool should measure in a calibration experiment.

A particular case in which the analytic solution can be derived is the case of a loop that lies on the surface of a cylinder, concentric with the axis, at an angle that can vary from zero to ninety degrees, i.e. an elliptical loop with the metal pipe at the center, concentric with the loop. In this case, the problem can be separated into cylindrical domains and can be solved analytically by using separation of variables. This means that the calibration can be made very accurate for the case of elliptically shaped transmitters and receivers and calibration loop. In fact, by using reciprocity, which means that the coupling between a transmitter and a receiver is identical when the roles of transmitter and receiver are interchanged, the problem can be solved to a good approximation with the effect of the metal pipe at the center included, even if the transmitter and receiver are not elliptical provided the calibration loop is elliptical. This last approximation leaves out the coupling between the pipe and the transmitter and receiver, but this effect can be approximated to improve the result. Alternatively, if the transmitter and receiver are elliptical, the loop can be of arbitrary shape, a freedom that can be used to design a calibration device that maximizes the signal at the receivers. This last approximation leaves out the coupling between the pipe and the loop, but this effect can be approximated to improve the result. The fact that the precise shape of the loop is not important, in the second case, is due to the fact that the field generated by the transmitter can be solved analytically in the presence of the metal pipe at the center and the effect on the calibration loop can be evaluated by the integral along the path of the loop, which can be done easily.

As taught herein, an embodiment of a method is provided to calibrate an MCI tool to achieve better accuracy based on a specific geometry used for the purpose of solving the problem including a metal pipe at the center analytically.

Figure 1:
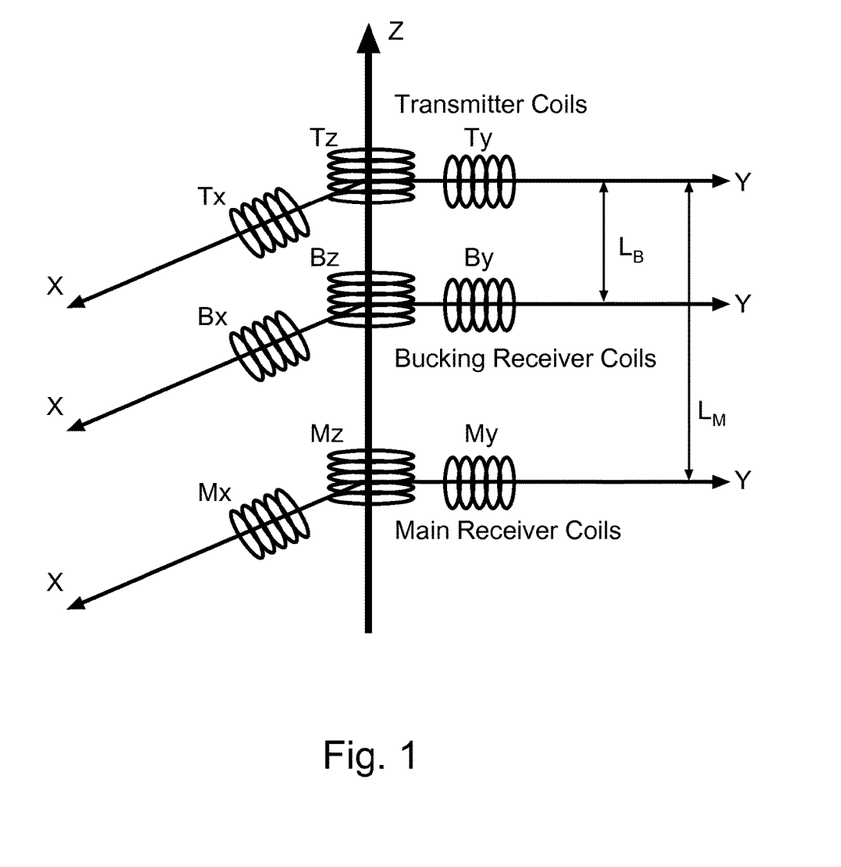
FIG. 1 is a block diagram of an example multi-component induction tool.

A typical multi-component induction logging tool can consist of a triad of transmitter coils oriented along the x-, y-, and z-directions and a triad of receiver coils with similar orientations. The receiver coils are used to collect electromagnetic signals from surrounding formation that is excited by the transmitter coils. In a traditional induction logging tool, to remove the signal that goes directly from the transmitter to the receiver and obtain a better measurement of the formation response, the receiver is made of two functional parts; a main receiver coil and a bucking receiver coil, referred to as main and bucking coils. The same concept can be readily used for multi-component induction tool. FIG. 1 is a schematic representation of an example multi-component induction tool array having transmitter coils ($T_x$, $T_y$, and $T_z$), bucking receiver coils ($B_x$, $B_y$, and $B_z$), and main receiver coils ($M_x$, $M_y$, and $M_z$) having the separation distances $L_B$ and $L_M$.

In various embodiments, a method to calibrate induction tools can include using a tilted loop calibrator to calibrate seven of the nine components of the MCI tool. The calibration method for the last two remaining components can include using a selected portion of the results from the calibration of the seven components.

In operation, the induced voltage received by a receiver of an induction tool can be amplified, digitized and processed through electronic circuits and firmware. A surface computer receives an uncalibrated number. This number (signal) is then converted into apparent conductivity by using the following linear transformation:

$$\sigma_a = S \cdot G - \sigma_{offset}, \quad (1)$$

where S is the received signal; G is a multiplier, called gain; and $\sigma_{offset}$ is an additive constant, called offset or sonde error. The calibration of the induction tool relates to the determination of the gain and the offset.

Because induction logging tools have very large response volumes, it is very difficult to make equivalent artificial formation of known conductivity to use in calibration. Stemming from the Doll induction theory, loop calibrators are normally used. For the standard tools that measure only the ZZ coupling, the loop is oriented in the plane perpendicular to the axis of the tool. As mentioned previously, array induction tools normally have a metallic cylinder concentric with the axis that shields the wiring that connects to the antennas. In the standard ZZ coupling tools, the problem of a circular loop with a cylindrical metallic tube at the center with circular transmitter and receivers can be solved very accurately with analytic techniques. This allows for high accuracy in the modeling of the calibration experiment, which leads to a more accurate calibration of the tool.

Unfortunately, when the receiver and transmitter coils or the loop are tilted, the analytic solution including the metal cylinder at the center becomes much more difficult. Even though a solution could be attempted using an analytic solution for the problem of a dipole in front of a metal cylinder, it is very difficult to achieve the high accuracy needed for the modeling of the calibration experiment.

There is one case that allows for a relatively simple and highly accurate analytic solution by implementing a method similar to that used in the modeling of the standard induction tools. This case requires a special geometry of the calibration experiment. This special case is that in which the tilted coils, transmitter and receivers, and the tilted loop are ellipses that correspond to the intersection between a tilted plane and a cylinder concentric with the axis of the tool. In this case, the problem can be solved analytically including the effect of the metal cylinder at center by using a technique that is similar in complexity and accuracy to that used in the case of the standard induction calibration experiment.

This geometry and an embodiment of an improved calibration routine, as taught herein, which more likely captures the maximum values of the loop response in the calibration method, can be used. In the following, details of a calibration routine and equations used to solve for the gains and offsets are given.

In a MCI calibration method, two loops can be used. An elliptical tilted loop can be used to calibrate non-standard components, and a circular loop can be used to calibrate standard ZZ component. A loop sweeping experiment, which means moving the calibration loop along the tool body in the axial direction, can be executed that provides the maximum values produced by the loop for the seven components that have non-zero results: XX, XZ, ZX, YY, YZ, ZY, and ZZ. The following procedure applies to these components. The procedure for XY and YX is described afterwards.

Figure 2A:
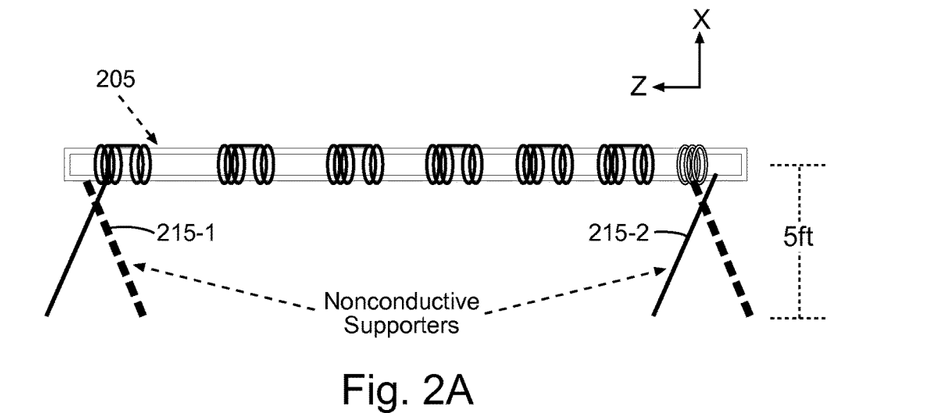
FIGS. 2A-2F are schematic representations of an example loop calibration setup.
Figure 2B:
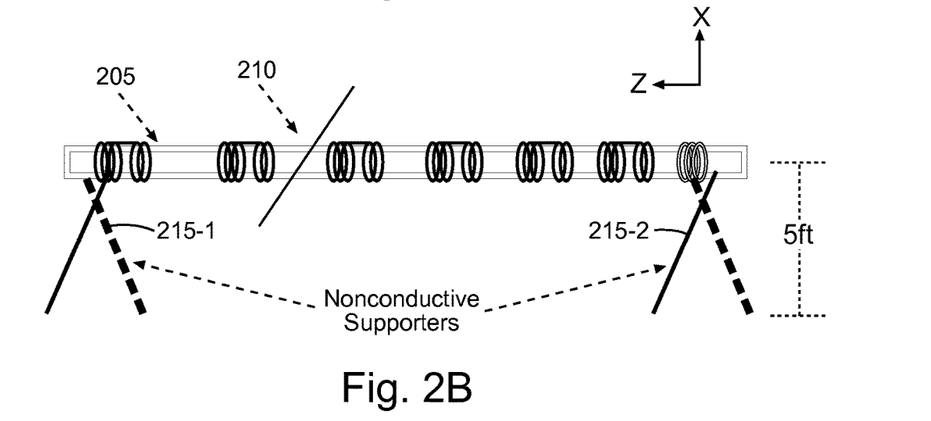
Figure 2C:
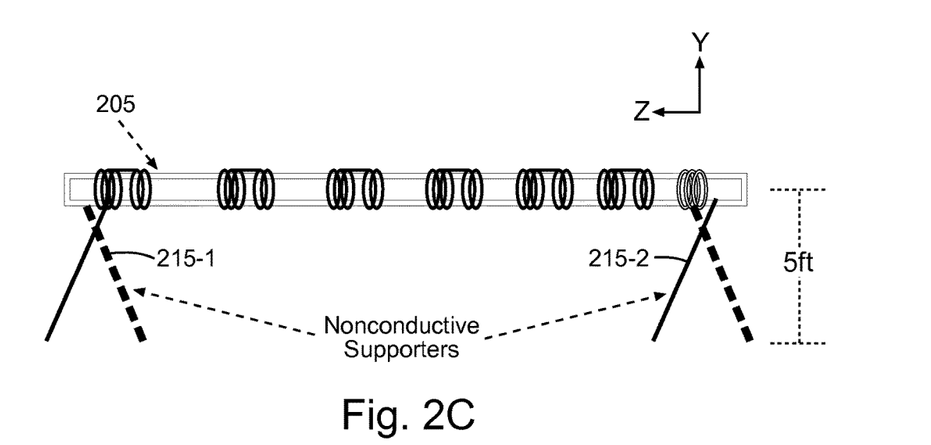
Figure 2D:
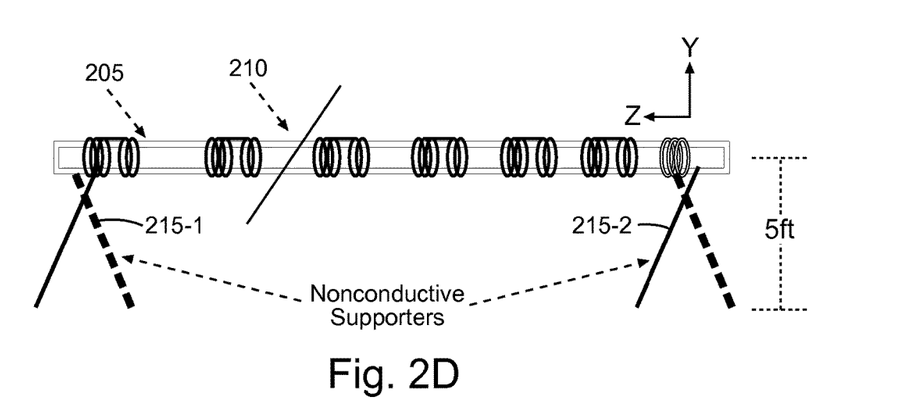
Figure 2E:
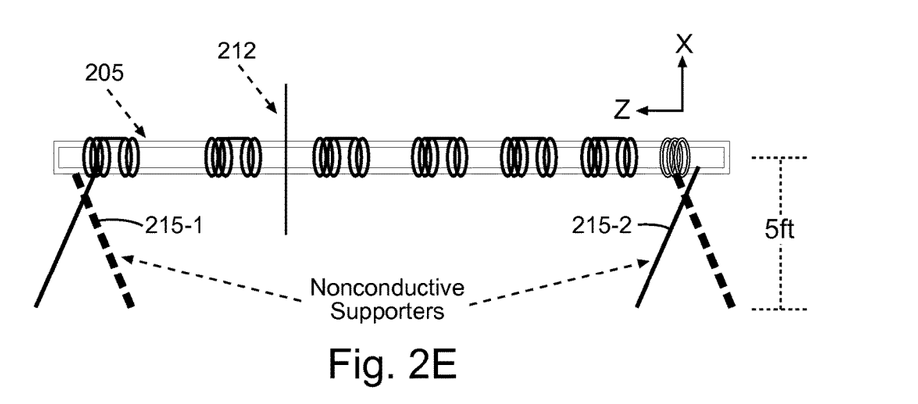

FIGS. 2A-2F are schematic representations of an example loop calibration setup. The loop calibration setup in FIGS. 2A-2F uses a tilted loop and a non-tilted loop. The calibration can be achieved through six steps: a "loop-off-xdipole-up" step, a "loop-on-xdipole-up" step, a "loop-off-ydipole-up" step, a "loop-on-ydipole-up" step, a "loop-on-zz" step using circular non-tilted loop, and an "air-hang" step. FIG. 2A is a representation of a measurement setup with x-direction antenna positioned up to sky with no loop (loop-off) disposed around the MCI tool 205 that is positioned at a distance above ground by non-conductive supports 215-1 and 215-2. In the non-limiting example of FIGS. 2A-2E, the MCI tool 205 is positioned at 5 ft. above a ground, though other distances can be used. FIG. 2B is a representation of a measurement setup with x-direction antenna positioned up to sky with a tilted loop 210 disposed around the MCI tool 205 (loop-on). FIG. 2C is a representation of a measurement setup with y-direction antenna positioned up to sky with no loop (loop-off) disposed around the MCI tool 205. FIG. 2D is a representation of a measurement setup with y-direction antenna positioned up to sky with the tilted loop 210 disposed around the MCI tool 205 (loop-on). FIG. 2E is a representation of a measurement setup with a non-tilted loop 212 disposed around the MCI tool 205 (loop on) to measure ZZ component. Orientation of the loop 212 is non-tilted when an axis of the loop is perpendicular to the axis of the cylindrical structure of the MCI tool 205, as shown in FIG. 2E.

Figure 2F:
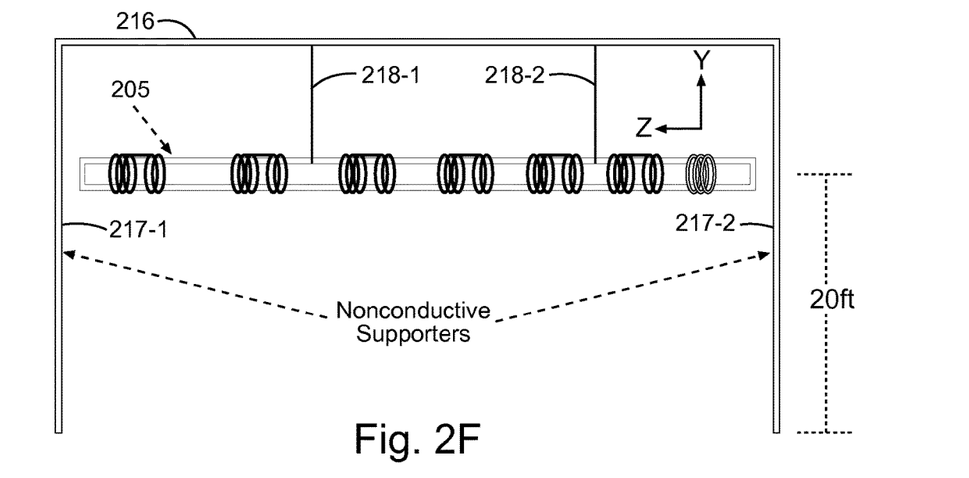

FIG. 2F is a representation of a measurement setup with the MCI tool 205 disposed from support structure 216 that is positioned on support structures 217-1 and 217-2, where the MCI tool 205 is hung from support structure 216 by connections 218-1 and 218-2 at a distance from ground significantly larger than the distance MCI tool 205 is placed above ground for the setups of FIGS. 2A-2E. In the non-limiting example of FIG. 2F, the MCI tool 205 is positioned at 20 ft. above a ground, though other distances can be used. Because ground is conductive, even if there is nothing around the MCI tool 205, some connectivity can still be measured due to the conductivity of the ground where the calibration is being conducted. But if the MCI tool 205 is raised, then the effect of the connectivity of the ground is reduced with the ground being significantly farther away with respect to the measurement parameters. Based on the difference between the measurements at the two heights, one can solve for the connectivity of the ground, and its effect can be removed from the measurement procedure.

In the experiments associated with FIGS. 2A-2F, a select transmitter of the MCI tool 205 is activated. Currents are generated on the tilted loop 210 and the non-tilted loop 212, in the respective setups, in response to the transmission from the selected transmitter. Signals are received at selected receivers of the MCI tool 205 in response to the transmission from the selected transmitter and currents generated on the tilted loop 210 and the non-tilted loop 212 in the respective setups.

The gain G can be calculated with the following equations:

$$G^{xx} = \frac{\sigma^{xx}_{calibrator}}{S^{xx}_{loop\_on\_xdipole\_up} - S^{xx}_{loop\_off\_xdipole\_up}}, \quad (2\text{-}a)$$

$$G^{xz} = \frac{\sigma^{xz}_{calibrator}}{S^{xz}_{loop\_on\_xdipole\_up} - S^{xz}_{loop\_off\_xdipole\_up}}, \quad (2\text{-}b)$$

$$G^{zx} = \frac{\sigma^{zx}_{calibrator}}{S^{zx}_{loop\_on\_xdipole\_up} - S^{zx}_{loop\_off\_xdipole\_up}}, \quad (2\text{-}c)$$

$$G^{yy} = \frac{\sigma^{yy}_{calibrator}}{S^{yy}_{loop\_on\_ydipole\_up} - S^{yy}_{loop\_off\_ydipole\_up}}, \quad (2\text{-}d)$$

$$G^{yz} = \frac{\sigma^{yz}_{calibrator}}{S^{yz}_{loop\_on\_ydipole\_up} - S^{yz}_{loop\_off\_ydipole\_up}}, \quad (2\text{-}e)$$

$$G^{zy} = \frac{\sigma^{zy}_{calibrator}}{S^{zy}_{loop\_on\_ydipole\_up} - S^{zy}_{loop\_off\_ydipole\_up}}, \quad (2\text{-}f)$$

$$G^{zz} = \frac{\sigma^{zz}_{calibrator}}{S^{zz}_{loop\_on\_zz} - S^{zz}_{loop\_off\_ydipole\_up}}, \quad (2\text{-}g)$$

where $\sigma_{calibrator}$ is equivalent conductivities of tilted and non-tilted calibrators pre-computed; $S_{loop\_on\_xdipole\_up}$ and $S_{loop\_off\_xdipole\_up}$ are the signals received at "loop-on-xdipole-up" step and at "loop-off-xdipole-up" step with x-direction antenna positioned up to sky; $S_{loop\_on\_xdipole\_up}$ and $S_{loop\_off\_xdipole\_up}$ are the signals received at "loop-on-ydipole-up" step and at "loop-off-ydipole-up" step with y-direction antenna positioned up to sky; $S_{loop\_on\_zz}$ is the signal received at "loop-on-zz" step with y-direction antenna positioned up to sky and using non-tilted calibration loop. The offset is calculated with equation below:

$$\sigma_{offset} = S_{air\_hang} \cdot G, \quad (3)$$

where $S_{air\_hang}$ is the signal received at the "air-hang" step. The equivalent conductivities of the tilted and non-tilted calibrators pre-computed can be generated based on a model.

Figure 3A:
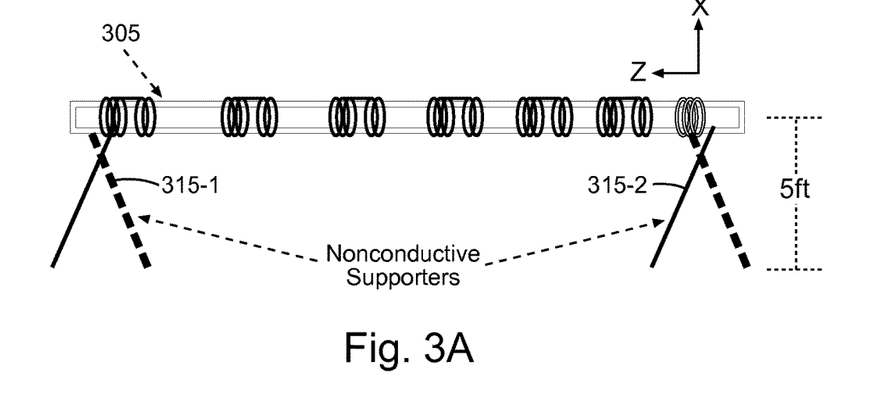
FIGS. 3A-3E are schematic representations of an example loop calibration setup.
Figure 3B:
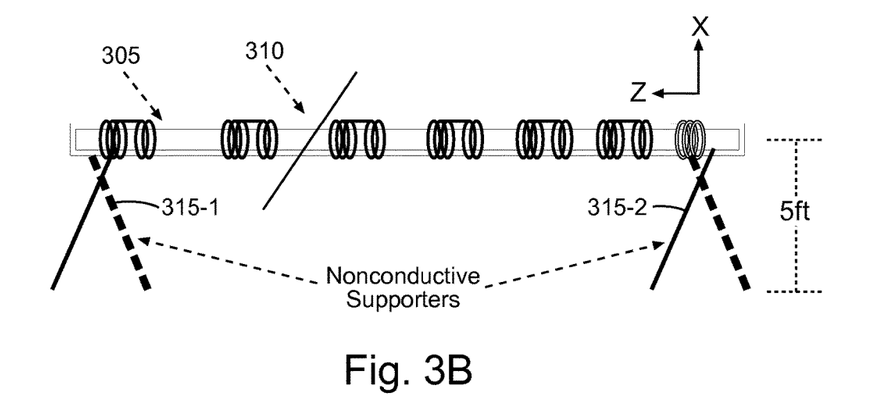
Figure 3C:
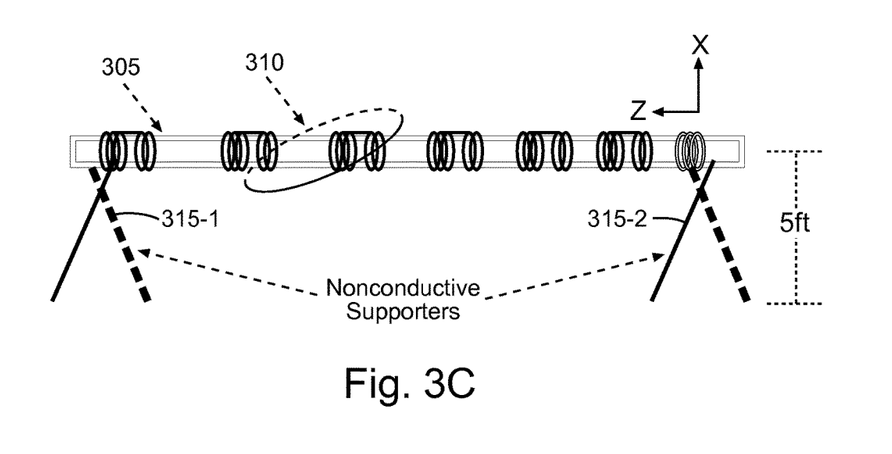

FIGS. 3A-3E are schematic representations of an example loop calibration setup. The loop calibration setup in FIGS. 3A-3E uses a tilted loop and a non-tilted loop. FIG. 3A is a representation of a measurement setup with x-direction antenna positioned up to sky with no loop (loop-off) disposed around the MCI tool 305 that is positioned at a distance above ground by non-conductive supports 315-1 and 315-2. In the non-limiting example of FIGS. 3A-3D, the MCI tool 305 is positioned at 5 ft. above a ground, though other distances can be used. FIG. 3B is a representation of a measurement setup with x-direction antenna positioned up to sky with a tilted loop 310 disposed around the MCI tool 305 (loop-on). FIG. 3C is a representation of a measurement setup with x-direction antenna positioned up to sky with the tilted loop 310 disposed around the MCI tool 305 (loop-on), where the tilted loop 310 in FIG. 3C has been rotated, for example by 90 degrees, from its position in FIG. 3B. Though not shown in FIGS. 3A-3E, the measurement can be taken with y-direction antenna positioned up to sky with the tilted loop 310 disposed around the MCI tool 305 (loop-on) as the tilted loop 310 is rotated, either, x pointing up or y pointing up, provide information required to perform the calibration.

Figure 3D:
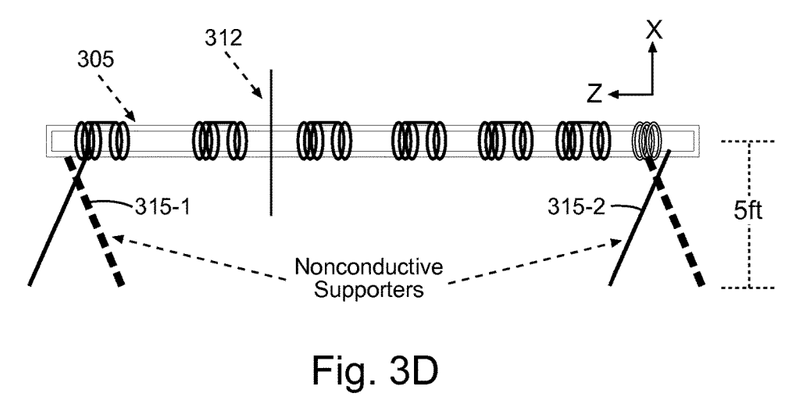
Figure 3E:
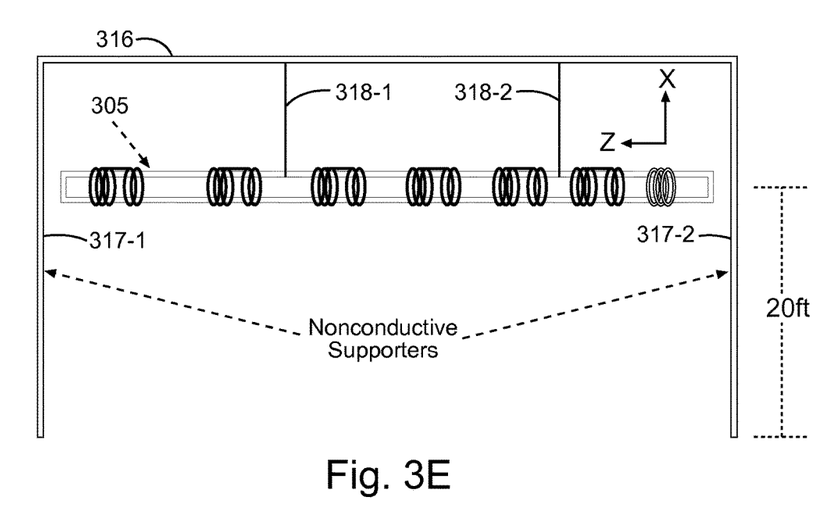

FIG. 3D is a representation of a measurement setup with a non-tilted loop 312 disposed around the MCI tool 305 (loop on) to measure ZZ component. FIG. 3E is a representation of a measurement setup with the MCI tool 305 disposed from support structure 316 that is positioned on support structures 317-1 and 317-2, where the MCI tool 305 is hung from support structure 316 by connections 318-1 and 318-2 at a distance from ground significantly larger than the distance MCI tool 305 is placed above ground for the setups of FIGS. 3A-3D. In the non-limiting example of FIG. 3D, the MCI tool 305 is positioned at 20 ft. above a ground, though other distances can be used. In the experiment associated with FIGS. 3A-3E, the tilted loop 310 can be rotated in 90 degrees to measure the coupling of the perpendicular component in the transverse direction, while in the experiment associated with FIGS. 2A-2F, tool 205 can be rotated.

An alternative approach is to position the loop at the maximum response of each component along the z-axis and then to rotate the tilted loop around Z-axis to capture the maximum. The same equations above would be used to find the required calibration parameters, because the same maximum data can be found by using this alternative positioning and rotation procedure.

For the calibration of XY and YX components, one can take advantage of the fact that there are only 6 calibration constants per array per frequency, 3 associated with transmitters and 3 associated with receivers. From the measurements of the other seven experimental values, the calibration for these two components can be derived. For example the following equations can be used.

$$G^{xy} = \frac{G^{xx} \cdot G^{zy}}{G^{zx}} = \frac{G^{xz} \cdot G^{yy}}{G^{yz}} = \frac{G^{xz} \cdot G^{zy}}{G^{zz}} \quad (4\text{-}a)$$

$$G^{yx} = \frac{G^{yy} \cdot G^{zx}}{G^{zy}} = \frac{G^{yz} \cdot G^{xx}}{G^{xz}} = \frac{G^{yz} \cdot G^{zx}}{G^{zz}} \quad (4\text{-}b)$$

Note that this method can be extended to find the calibration constants of any coupling component from the known values of the other coupling components.

A rigorous formulation for calibration can be used. Taking account of the temperature effect, a measured signal (S) can be converted into apparent conductivity ($\sigma_a$) by the following equation.

$$\sigma_a = S \cdot G - \sigma_{sonde}(T_{ref}) - \Delta \sigma_T(T), \quad (5)$$

where $\sigma_{sonde}(T_{ref})$, referred to as "sonde error", is the apparent conductivity portion from the tool body when the temperature is $T_{ref}$; $\Delta\sigma_T$ is the temperature effect which is a function of the temperature (T). Here, it is assumed that the temperature effect is zero when the tool temperature equals $T_{ref}$, which is chosen to be 25° C.

Following Equation (5), one can obtain the response equations for the calibration steps. At "loop-off" step, $$S_{loop\_off} \cdot G = \sigma_{ground}(H_{loop\_off}) + \sigma_{sonde}(T_{ref}) + \Delta\sigma_T(T_{loop\_off}), \quad (6)$$

where $\sigma_{ground}$ is the apparent conductivity portion from the earth ground, which is treated as a semi-infinite plane; $H_{loop\_off}$ is the height where the tool is positioned for "loop-off" step. The height is commonly chosen 5 ft above the ground as shown in FIGS. 2A-2E, though other heights can be chosen. $\Delta\sigma_T(T_{loop\_off})$ is the temperature effect which is a function of the temperature of the "loop-off" step $(T_{loop\_off})$. At "loop-on" step, $$S_{loop\_on} \cdot G = \sigma_{calibrator} + \sigma_{ground}(H_{loop\_on}) + \sigma_{sonde}(T_{ref}) + \Delta\sigma_T(T_{loop\_on}), \quad (7)$$

where $\sigma_{calibrator}$ is the equivalent conductivity of the calibrator; $\Delta\sigma_T(T_{loop\_on})$ is the temperature effect which is a function of the temperature of the "loop-on" step $(T_{loop\_on})$; $H_{loop\_on}$ is the height where the tool is positioned for "loop-on" step, which is commonly chosen the same as for the "loop-off" step. At "air-hang" step, $$S_{air\_hang} \cdot G = \sigma_{ground}(H_{air\_hang}) + \sigma_{sonde}(T_{ref}) + \Delta\sigma_T(T_{air\_hang}), \quad (8)$$

where $H_{air\_hang}$ is the height where the tool is positioned for the "air-hang" step, which is commonly chosen 20 ft above the earth ground. Combining equations (6) and (7), one can obtain $$G = \frac{\sigma_{calibrator} + [\sigma_{ground}(H_{loop\_on}) - \sigma_{ground}(H_{loop\_off})] + [\Delta\sigma_T(T_{loop\_on}) - \Delta\sigma_T(T_{loop\_off})]}{S_{loop\_on} - S_{loop\_off}}. \quad (9)$$

When the temperature effect for the "loop-on" step equals that of the "loop-off" step and the heights are identical, equation (9) reduces back to a form of equation (2). In other words, the pre-assumption for equation (2) is that the temperature effects and the ground effects are the same for both the "loop-off" step and the "loop-on" step. This pre-assumption can be met by making $$H_{loop\text{-}on} = H_{loop\text{-}off}, \text{ and}$$

$$T_{loop\text{-}on} = T_{loop\text{-}off}.$$

From equation (8), one can obtain the equation to calculate the sonde error.

$$\sigma_{sonde}(T_{ref}) = S_{air\_hang} \cdot G - \sigma_{ground}(H_{air\_hang}) - \Delta\sigma_T(T_{air\_hang}). \quad (10)$$

Properly evaluating the ground effect $\sigma_{ground}(H_{air\_hang})$ and temperature effect $\Delta\sigma_T(T_{air\_hang})$ becomes a key for accurate sonde error $\sigma_{sonde}(T_{ref})$. The evaluation of $\Delta\sigma_T(T_{air\_hang})$ can be achieved by characterizing tool response behavior through predesigned heating tests. Earth ground conductivity can be calculated using only ZZ component from the MCI tool being calibrated. Ground effects on all components can be then computed from a forward modeling program or a pre-computed table.

In various embodiments, a systematic method, as taught herein, provides for accurate calibration of an MCI tool. An elliptical tilted calibration loop and a circular non-tilted calibration loop can be used in a multi-stage calibration procedure to provide fast and accurate calibration of the MCI tool. An embodiment can be realized to provide accurate calibration for the multi-component induction tool. Features of calibration methods may include:

[1] Use of an elliptical tilted loop to produce non-traditional components XX/XZ/YY/YZ/ZX/ZY.
[2] Use of a standard circular loop to calibrate the ZZ standard component.
[3] A simplified calibration approach of XY/YX components.
[4] Use of only ZZ component to calculate earth ground conductivity.

An MCI tool has three transmitter orientations and three receiver orientations that give raise to nine-coupling signals at each frequency. In embodiments of an MCI calibration method, as taught herein, seven components of XX, XZ, YY, YZ, ZX, ZY, and ZZ can be calibrated first. From the measurements of the seven experimental values, the gains for the remaining two components (XY and YX) can be derived.

After the gains have been found, the offsets can be evaluated by lifting the tool from the surface to a height such as 20 ft, in a so called air hang experiment. The offsets can be evaluated as:

$$\sigma_{offset} = S_{air\_hang} \cdot G. \quad (11)$$

With gains and offsets evaluated, the apparent conductivities for every component at every frequency can be obtained from equations of the form:

$$\sigma_a = S \cdot G - \sigma_{offset}, \quad (12)$$

where S is the received signal, G the gain, and $\sigma_{offset}$ is the additive constant also called sonde error.

On a rigorous calibration formulation, the calibration accuracy depends on the compensation for the temperature effect, the earth ground effect, and the suppression of the random noise. For details regarding incorporation of these corrections into a rigorous calibration scheme, see for example Xiao et al., (2006) (Xiao, J., Buchanan, J., Bittar, M., Davis, E., Sanmartin, L., Hu, G. Zannoni, S., Morys, M., and Liu, W., 2006, A new asymmetrical array induction logging tool: SPE 101930.).

Figure 4:
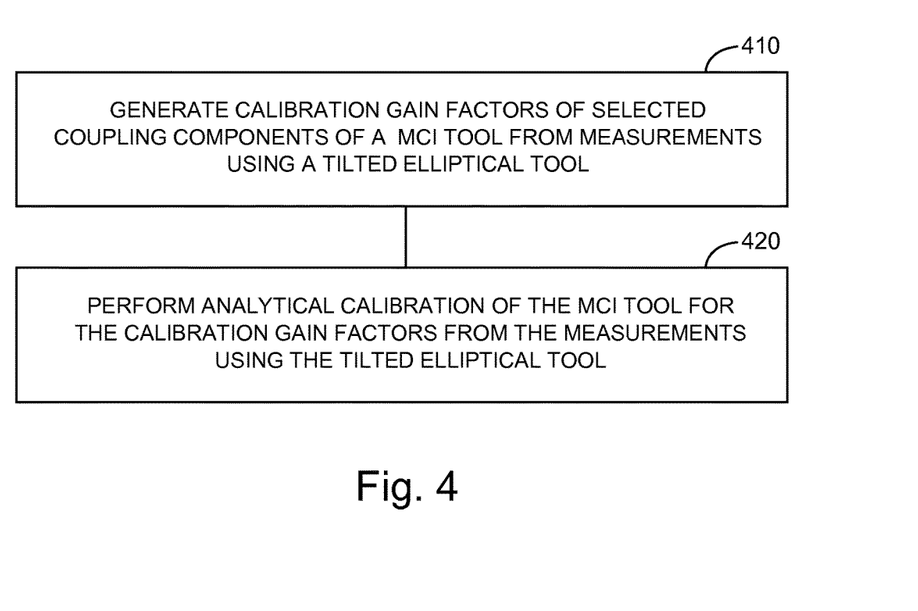
FIG. 4 is a flow diagram of features of an example method of calibrating a multi-component induction tool.

FIG. 4 is a flow diagram of features of an example method of calibrating a multi-component induction tool. At 410, calibration gain factors of selected coupling components of a MCI tool are generated from measurements using a tilted elliptical loop. Calibration gain factors of a number of components can be generated by using selected gain factors generated from using the tilted elliptical loop. At 420, analytic calibration of the MCI tool is performed for the calibration gain factors from the measurements using the tilted elliptical loop. A number of techniques can be used to generate the calibration gain factors using the tilted elliptical loop for analytic calibration of the MCI tool.

Figure 5:
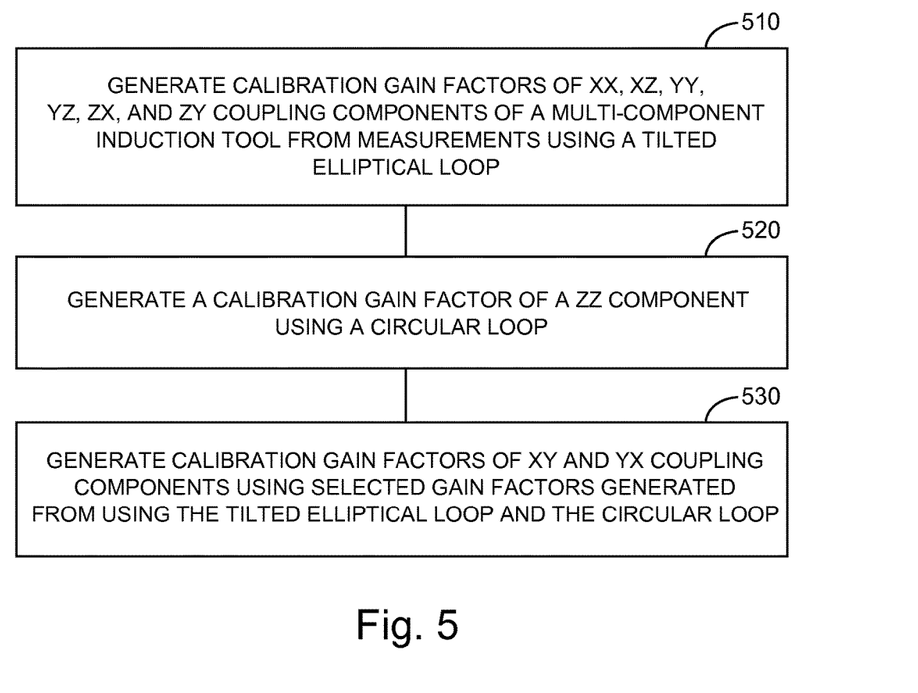
FIG. 5 is a flow diagram of features of an example method of calibrating a multi-component induction tool.

FIG. 5 is a flow diagram of features of an example method of calibrating a multi-component induction tool. At 510, calibration gain factors of XX, XZ, YY, YZ, ZX, and ZY coupling components of a multi-component induction tool are generated from measurements using a tilted elliptical loop. Such gain factors can be generated as an analytic calibration of the multi-component induction tool. The multi-component induction tool can be structured having a longitudinal axis along a z-axis with respect to these measurements. At 520, a calibration gain factor of a ZZ component is generated using a circular loop for the analytic calibration. At 530, calibration gain factors of XY and YX coupling components are generated using selected gain factors generated from using the tilted elliptical loop and the circular loop.

Various features associated with a method corresponding to FIG. 4 and/or FIG. 5 can include a number of additional actions or structures. Generating the calibration gain factors of the six components can include: generating signals with the tilted elliptical loop around the multi-component induction tool; generating signals without using the tilted elliptical loop; and generating each respective gain factor of a coupling component based on a difference between a signal correlated to the respective coupling component with the tilted elliptical loop around the multi-component induction tool and a signal correlated to the respective coupling component without using the tilted elliptical loop.

Features associated with a method corresponding to FIG. 4 and/or FIG. 5 can include generating the signals with the tilted elliptical loop around the multi-component induction tool at a temperature and with the multi-component induction tool at a height that is the same as when generating the signals without using the tilted elliptical loop.

Features associated with a method corresponding to FIG. 4 and/or FIG. 5 can include generating maximum values provided by the tilted elliptical loop by loop sweeping the tilted elliptical loop. The loop sweeping can be conducted by rotating the multi-component induction tool. The loop sweeping can be conducted by rotating the tilted elliptical loop.

Features associated with a method corresponding to FIG. 4 and/or FIG. 5 can include positioning the tilted elliptical loop at a maximum response of each component along the z-axis and rotating the tilted elliptical loop around the z-axis to capture the maximum.

Features associated with a method corresponding to FIG. 4 and/or FIG. 5 can include determining a conductivity offset by measuring a signal with the multi-component induction tool at a height greater than that at which the multi-component induction tool is disposed to generate the calibration gain factors.

Features associated with a method corresponding to FIG. 4 and/or FIG. 5 can include determining a sonde error including evaluating temperature effect on the sonde error by characterizing tool response behavior of the multi-component induction tool through heating tests.

Features associated with a method corresponding to FIG. 4 and/or FIG. 5 can include calculating earth ground conductivity using only the ZZ component from the multi-component induction tool.

Features associated with a method corresponding to FIG. 4 and/or FIG. 5 can include computing ground effects on all components from a forward modeling program or a pre-computed table.

One of more portions of these features associated with FIG. 4 and/or FIG. 5 may be combined to generate additional embodiments to calibrate a multi-component induction tool. In addition, a machine-readable storage device can have instructions stored thereon, which, when performed by a machine, cause the machine to perform operations, the operations comprising a method associated with any of FIGS. 1-5 or combinations thereof. Further, a machine-readable storage device, herein, is a physical device, which is a non-transitory device, that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

In various embodiments, a system comprises a processor unit and a memory unit operatively coupled to the processor unit, where the memory unit has instructions stored thereon, which, when executed by the processor unit, cause the system to perform operations according to a method associated with any of FIGS. 1-5 or combinations thereof. The system can include a MCI tool and an elliptical loop. The elliptical loop can be positioned around the MCI tool, moveable along the axis of the MCI tool, and tiltable with respect to the axis of the MCI tool. Various components and/or features associated with the system can include a number of additional structures or structures arranged to conduct additional actions related to a MCI tool and/or calibration of the multi-component induction tool.

Figure 6:
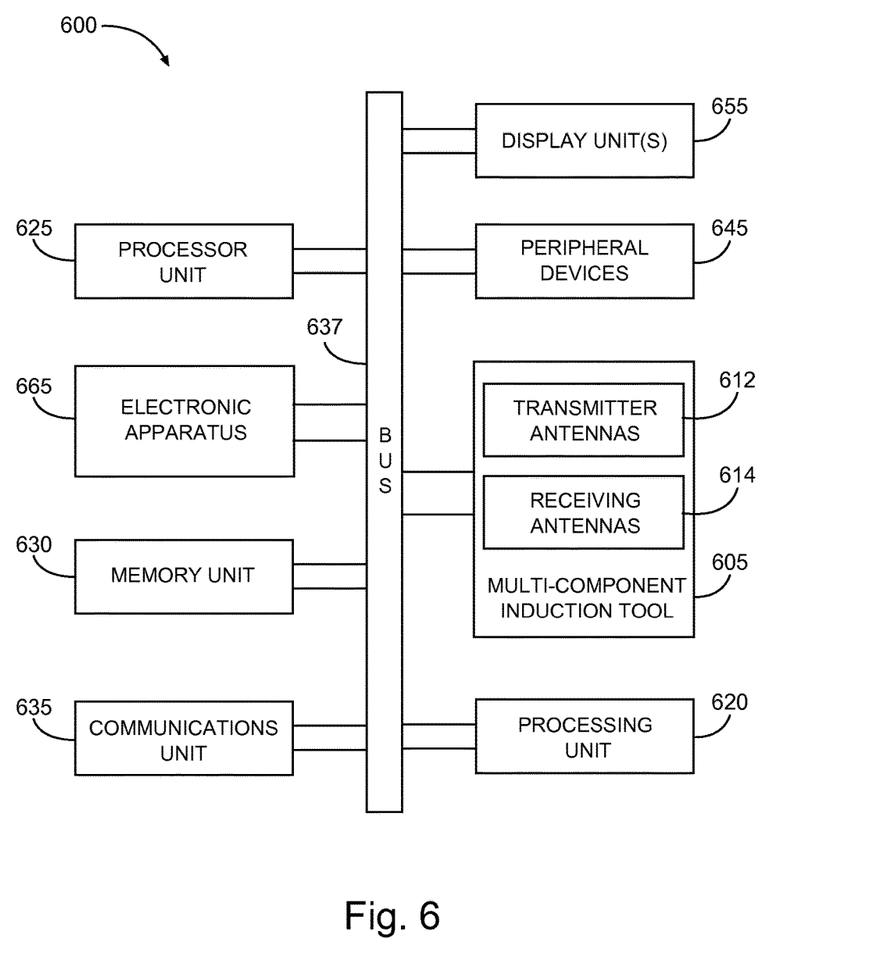
FIG. 6 is a block diagram of features of an example embodiment of a system operable to calibrate a multi-component induction tool.

FIG. 6 is a block diagram of features of an example embodiment of a system 600 operable to calibrate a multi-component induction tool 605, as described herein or in a similar manner. The system 600 can include a MCI tool 605 having an arrangement of transmitter antennas 612 and receiver antennas 614. The system 600 can be configured to operate in accordance with the teachings herein.

The system 600 can include a processor unit 625, a memory unit 630, an electronic apparatus 665, and a communications unit 635. The memory unit 630 can be structured to include a database. One or more of the processor unit 625, the memory unit 630, and the communications unit 635 can be arranged to operate to control operation of the transmitter antennas 612 and the receiver antennas 614 and to perform operations on the signals collected by the receiver antennas 614 to calibrate the MCI tool 605. A processing unit 620, structured to calibrate a MCI tool, can be implemented as a single unit or distributed among the components of the system 600 including electronic apparatus 665. The processor unit 625 and the memory unit 630 can operate to control activation of a selected transmitter antenna of the transmitter antennas 612 to generate a signal for calibration. The processor unit 625 and the memory unit 630 can operate to control selection of the receiver antennas 614 in the MCI tool 605 and to manage processing schemes. The processor unit 625, the memory unit 630, and other components of the system 600 can be structured, for example, to operate similar to or identical to the processing components discussed herein or similar to or identical to any of methods discussed herein.

The system 600 can also include a bus 627, where the bus 627 provides electrical conductivity among the components of the system 600. The bus 627 can include an address bus, a data bus, and a control bus, each independently configured or in an integrated format. The bus 627 can be realized using a number of different communication mediums that allows for the distribution of components of the system 600. Use of the bus 627 can be regulated by the processor unit 625. Bus 627 can include a communications network.

In various embodiments, the peripheral devices 645 can include additional storage memory and other control devices that may operate in conjunction with the processor unit 625 and the memory unit 630. In an embodiment, the processor unit 625 can be realized as a processor or a group of processors that may operate independently depending on an assigned function. The system 600 can include display unit(s) 655, which can be used with instructions stored in the memory unit 630 to implement a user interface to display results of a calibration procedure and/or monitor the operation of the tool 605 and/or components distributed within the system 600.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   generating a calibration signal using a transmitter of a multi-component induction tool while a tilted elliptical loop is around the multi-component induction tool;
   generating a second signal by using the transmitter without the tilted elliptical loop around the multi-component induction tool;
   generating calibration gain factors of selected coupling components of the multi-component induction tool based on a measurement of the calibration signal for analytic calibration of the multi- component induction tool and on a measurement of the second signal, wherein the calibration signal and the second signal are generated at a same temperature and height; and
   determining an electrical property of a formation based on the calibration gain factors and formation measurements made by the multi-component induction tool.

2. The method of claim 1, further comprising generating additional calibration gain factors of a number of components by using selected gain factors generated from using the tilted elliptical loop.

3. The method of claim 1, wherein generating the calibration gain factors comprises:
   generating calibration gain factors of XX, XZ, YY, YZ, ZX, and ZY coupling components of the multi- component induction tool, the multi-component induction tool having a longitudinal axis along a z-axis;
   generating a calibration gain factor of a ZZ coupling component using a circular loop for the analytic calibration; and
   generating calibration gain factors of XY and YX coupling components using selected gain factors generated from using the tilted elliptical loop and the circular loop.

4. The method of claim 1, wherein generating the calibration gain factors further comprises
   generating at least one gain factor of a coupling component based on a difference between the measurement of the calibration signal and the measurement of the second signal.

5. The method of claim 1, further comprising generating maximum values provided by the tilted elliptical loop by loop sweeping the tilted elliptical loop.

6. The method of claim 5, wherein the loop sweeping is conducted by rotating the multi-component induction tool.

7. The method of claim 5, wherein the loop sweeping is conducted by rotating the tilted elliptical loop.

8. The method of claim 1, wherein the multi-component induction tool has a longitudinal axis along a z-axis, and wherein the method further comprises positioning the tilted elliptical loop at a maximum response of each component of a set of components along the z-axis and rotating the tilted elliptical loop around the z-axis to capture the maximum response, and wherein the set of components comprise XX, XZ, YY, YZ, ZX, ZY and ZZ coupling components.

9. The method of claim 1, further comprising determining a conductivity offset by measuring a signal with the multi-component induction tool at a height greater than that at which the multi-component induction tool is disposed to generate the calibration gain factors.

10. The method of claim 1, further comprising determining a sonde error, wherein determining the sonde error comprises evaluating temperature effect on the sonde error by characterizing tool response behavior of the multi-component induction tool through heating tests.

11. The method of claim 1, further comprising calculating earth ground conductivity using only a ZZ component from the multi-component induction tool.

12. The method of claim 1, further comprising computing ground effects on all components from a forward modeling program or a pre-computed table.

13. A non-transitory machine-readable storage device having instructions stored thereon, which, when performed by a machine, cause the machine to perform operations, the operations comprising:
   generating a calibration signal using a transmitter of a multi-component induction tool while a tilted elliptical loop is around the multi-component induction tool;
   generating a second signal by using the transmitter without the tilted elliptical loop around the multi-component induction tool;
   generating calibration gain factors of selected coupling components of the multi-component induction tool based on a measurement of the calibration signal for analytic calibration of the multi- component induction tool and on a measurement of the second signal, wherein the calibration signal and the second signal are generated at a same temperature and height; and
   determining an electrical property of a formation based on the calibration gain factors and formation measurements made by the multi-component induction tool.

14. A system comprising:
   a multi-component induction tool having an axis;
   an elliptical loop capable of being positioned around the multi-component induction tool, moveable along the axis, and tiltable with respect to the axis;
   a processor; and
   a memory operatively coupled to the processor, the memory having instructions stored thereon, which, when executed by the processor, cause the system to:
   generate a calibration signal using a transmitter of the multi-component induction tool while a tilted elliptical loop is around the multi-component induction tool;
   generate a second signal by using the transmitter without the tilted elliptical loop around the multi-component induction tool;
   generate calibration gain factors of selected coupling components of the multi-component induction tool based on a measurement of the calibration signal for analytic calibration of the multi-component induction tool and on a measurement of the second signal, wherein the calibration signal and the second signal are generated at a same temperature and height; and
   determine an electrical property of a formation based on the calibration gain factors and formation measurements made by the multi-component induction tool.

15. The system of claim 14, wherein the instructions further comprise instructions to generate additional calibration gain factors of a number of components using selected gain factors generated from use of the tilted elliptical loop.

16. The system of claim 14, wherein the instructions to generate the calibration gain factors further comprise instructions to:
generate calibration gain factors of XX, XZ, YY, YZ, ZX, and ZY coupling components of the multi-component induction tool, the axis being along a z-axis;
generate a calibration gain factor of a ZZ coupling component using of a circular loop for the analytic calibration; and
generate calibration gain factors of XY and YX coupling components from use of selected gain factors generated from use of the tilted elliptical loop and the circular loop.

17. The system of claim 14, wherein instructions to generate the calibration gain factors further comprises instructions to
generate at least one gain factor of a coupling component based on a difference between the measurement of the calibration signal and the measurement of the second signal.

18. The system of claim 14, further comprising instructions to generate maximum values provided by the tilted elliptical loop by a loop sweep of the tilted elliptical loop.

19. The system of claim 18, wherein the loop sweep comprises rotation of the multi-component induction tool.

20. The system of claim 18, wherein the loop sweep comprises rotation of the tilted elliptical loop.

21. The system of claim 14, wherein the multi-component induction tool has a longitudinal axis along a z-axis, and wherein the instructions further comprise instructions to position the tilted elliptical loop at a maximum response of each component of a set of components along the z-axis and to rotate the tilted elliptical loop around the z-axis to capture the maximum response, wherein the set of components comprise XX, XZ, YY, YZ, ZX and ZY coupling components.

22. The system of claim 14, further comprising instructions to determine a conductivity offset by measurement of a signal with the multi-component induction tool at a height greater than that at which the multi-component induction tool is disposed to generate the calibration gain factors.

23. The system of claim 14, further comprising instructions to determine a sonde error, wherein the instructions to determine the sonde error further comprises an evaluation of temperature effect on the sonde error by characterization of tool response behavior of the multi-component induction tool through heating tests.

24. The system of claim 14, wherein the multi-component induction tool has a longitudinal axis along a z-axis, and wherein the instructions further comprise instructions to calculate earth ground conductivity by use of only a ZZ coupling component from the multi-component induction tool.

25. The system of claim 14, further comprising instructions to compute ground effects on all components from a forward modeling program or a pre-computed table.

26. The non-transitory machine-readable storage device of claim 13, wherein the instructions to generate the calibration gain factors further comprises instructions to:
generate calibration gain factors of XX, XZ, YY, YZ, ZX, and ZY coupling components of the multi-component induction tool, the multi-component induction tool having a longitudinal axis along a z-axis;
generate a calibration gain factor of a ZZ coupling component using a circular loop for the analytic calibration; and
generate calibration gain factors of XY and YX coupling components using selected gain factors generated from using the tilted elliptical loop and the circular loop.

27. The method of claim 1, wherein at least one of the calibration gain factors are proportional to a ratio of a first value and a second value, and wherein the first value is based on a conductivity value, and wherein the second value is based on the measurement of the calibration signal.

28. The system of claim 14, wherein at least one of the calibration gain factors are proportional to a ratio of a first value and a second value, and wherein the first value is based on a conductivity value, and wherein the second value is based on the measurement of the calibration signal.

* * * * *